(12) United States Patent
Koren

(10) Patent No.: US 9,470,001 B2
(45) Date of Patent: *Oct. 18, 2016

(54) SYSTEM AND METHOD FOR INSTALLING COLUMNS

(71) Applicant: Column & Post, Inc., Fuquay-Varina, NC (US)

(72) Inventor: Robert Douglas Koren, Cary, NC (US)

(73) Assignee: Column & Post, Inc., Fuquay-Varina, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/219,204

(22) Filed: Mar. 19, 2014

(65) Prior Publication Data

US 2014/0202095 A1 Jul. 24, 2014

Related U.S. Application Data

(63) Continuation of application No. 12/850,980, filed on Aug. 5, 2010, now Pat. No. 8,713,873.

(51) Int. Cl.

| *E04C 3/30* | (2006.01) |
|---|---|
| *E04H 12/22* | (2006.01) |
| *G01C 15/10* | (2006.01) |
| *E02D 27/42* | (2006.01) |
| *E04F 19/00* | (2006.01) |
| *E04C 3/36* | (2006.01) |
| *E04B 1/18* | (2006.01) |

(52) U.S. Cl.
CPC .............. *E04F 19/00* (2013.01); *E02D 27/42* (2013.01); *E04B 1/18* (2013.01); *E04C 3/30* (2013.01); *E04C 3/36* (2013.01); *E04H 12/2261* (2013.01); *G01C 15/10* (2013.01)

(58) Field of Classification Search
CPC .............. E04C 3/30; E04C 3/32; E04C 3/34; E04C 3/36; G01C 15/10; E04H 12/2261; B25D 5/00; E02D 27/42
USPC ....... 52/244, 300, 301, 651.01, 651.07, 831, 52/836, 843, 745.17, 834, 835; 33/392, 33/394

See application file for complete search history.

(56) References Cited

U.S. PATENT DOCUMENTS

| 836,562 A | * | 11/1906 | Chambers | .............. | E04B 1/1906 |
| | | | | | 52/244 |
| 973,615 A | * | 10/1910 | Barrick | .................... | E02D 27/02 |
| | | | | | 52/292 |
| 1,350,686 A | * | 8/1920 | Trudelle | ..................... | E04C 3/36 |
| | | | | | 52/834 |
| 1,874,057 A | * | 8/1932 | Murphy | ................. | G01C 15/10 |
| | | | | | 33/370 |
| 1,934,260 A | * | 11/1933 | Dean | ........................ | E04C 3/34 |
| | | | | | 237/56 |
| 2,545,321 A | * | 3/1951 | Tumminello | .......... | G01C 15/10 |
| | | | | | 33/354 |
| 4,442,610 A | * | 4/1984 | Owens, Jr. | ............. | G01C 15/10 |
| | | | | | 33/392 |

(Continued)

*Primary Examiner* — Ryan Kwiecinski
(74) *Attorney, Agent, or Firm* — Coats & Bennett, P.L.L.C.

(57) ABSTRACT

A column includes a shaft, a capital assembly, and a base assembly. The capital assembly has an indexing member that attaches to an overhead support. The indexing member aligns the capital, which in turn, vertically aligns the shaft. The base assembly includes a retaining ring that attaches to an underlying support surface. The retaining ring has a plurality of notches arranged to form a cross-hair with an intersection located at the center of the retaining ring. The column also includes an alignment mechanism configured to be suspended from a center of the indexing member. When being aligned, the alignment mechanism is suspended below the indexing member substantially over the center of the retaining ring.

19 Claims, 8 Drawing Sheets

(56) References Cited

U.S. PATENT DOCUMENTS

| | | | | |
|---|---|---|---|---|
| 4,495,707 A * | 1/1985 | Rousey | | 33/392 |
| 5,481,809 A * | 1/1996 | Rooney | | 33/392 |
| 5,605,023 A * | 2/1997 | Biernazki | | E04C 3/30 52/301 |
| 5,692,351 A * | 12/1997 | Morrison, III | | E04C 3/36 52/263 |
| 6,305,670 B1 * | 10/2001 | Ward | | E04F 11/1842 256/59 |
| 7,055,256 B2 * | 6/2006 | Alecci | | G01C 15/10 33/392 |
| 7,216,467 B2 * | 5/2007 | Pott | | E04C 3/28 52/223.1 |
| 8,342,485 B2 * | 1/2013 | McGinness | | E04H 12/2253 256/65.14 |
| 8,424,259 B2 * | 4/2013 | Koren | | E04C 3/36 52/301 |
| 2006/0112656 A1 * | 6/2006 | Tarleton | | E04C 3/30 52/301 |
| 2008/0271396 A1 * | 11/2008 | Burke | | E04C 3/30 52/301 |
| 2009/0321596 A1 * | 12/2009 | Ehrhardt | | E02D 27/42 248/219.4 |
| 2010/0205884 A1 * | 8/2010 | Noirot | | E04F 19/00 52/301 |
| 2010/0205901 A1 * | 8/2010 | Petta | | E04C 3/30 52/831 |
| 2010/0300034 A1 * | 12/2010 | Noirot et al. | | 52/698 |

* cited by examiner

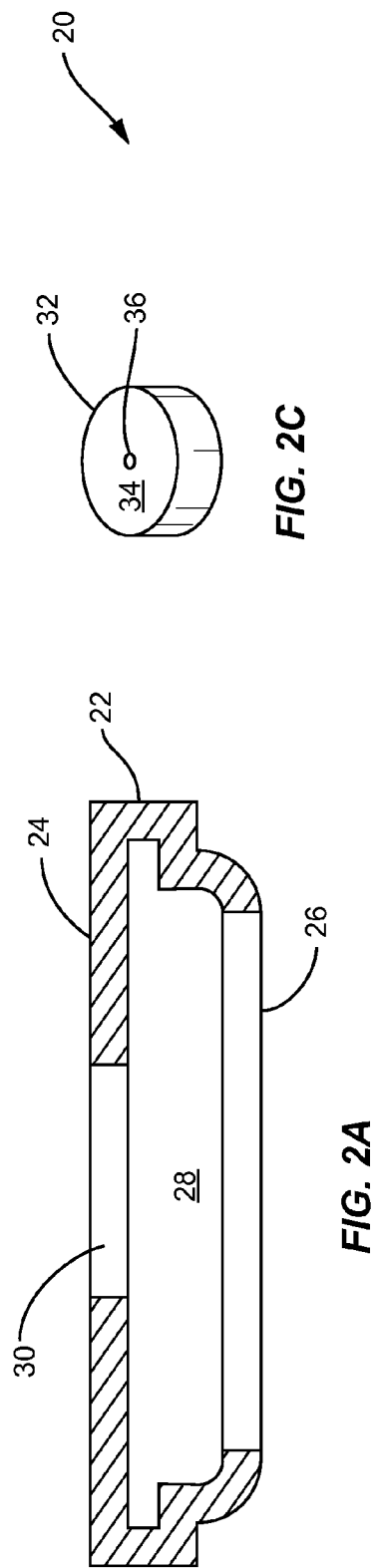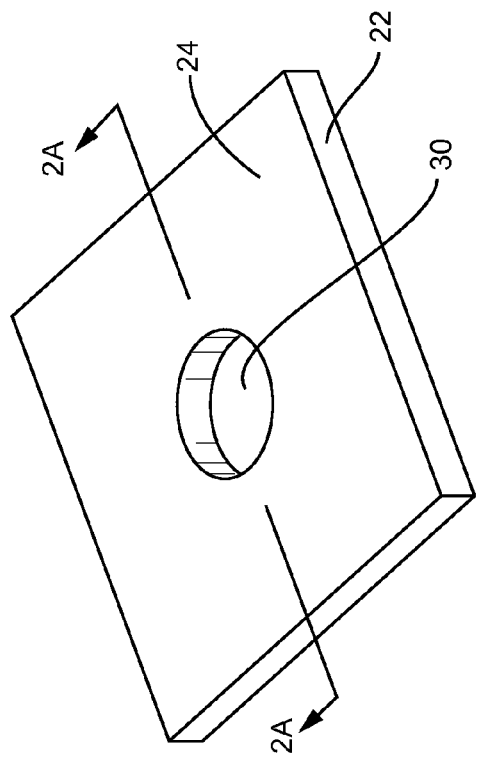

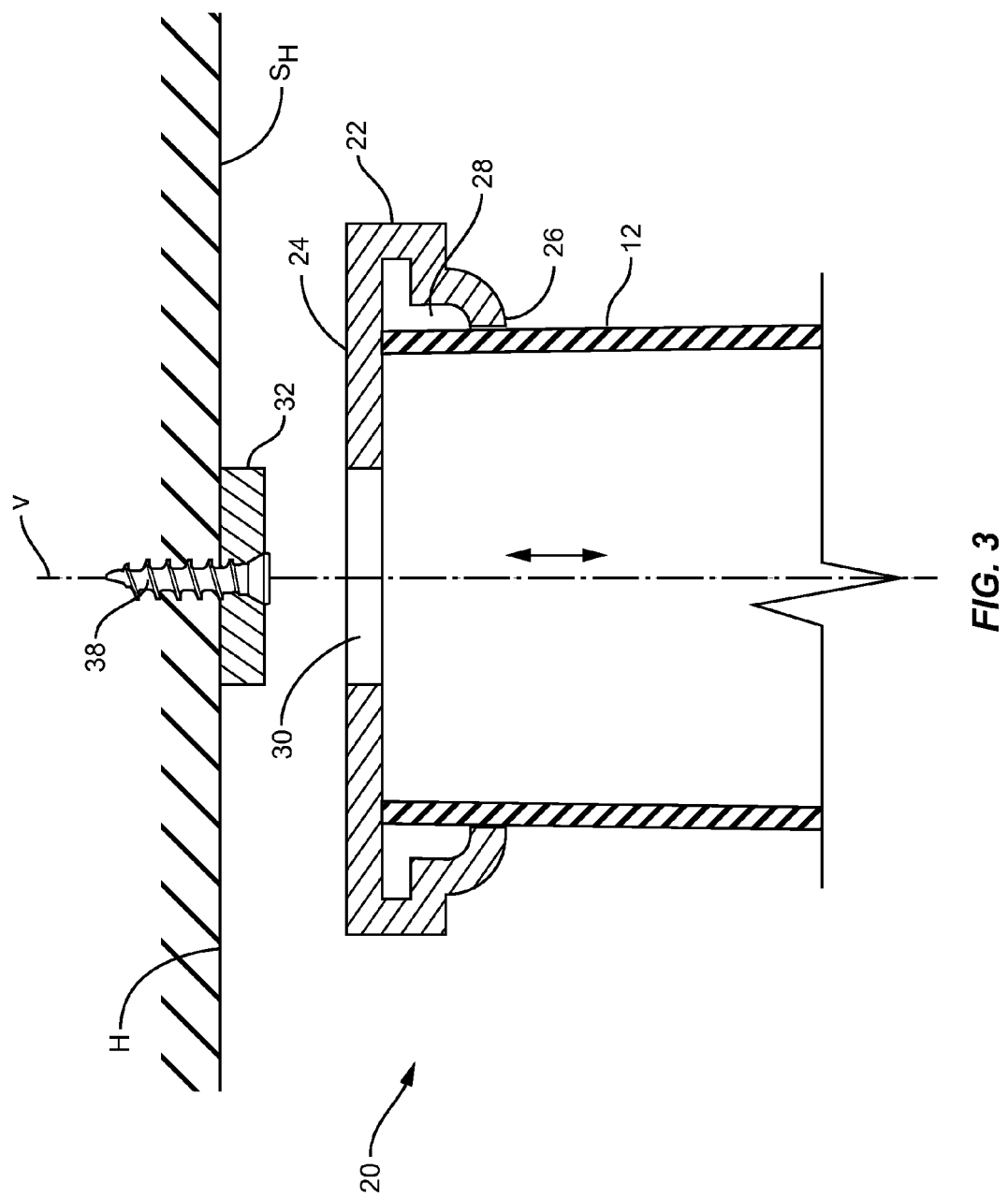

SYSTEM AND METHOD FOR INSTALLING COLUMNS

RELATED APPLICATION

The present application is a continuation of U.S. patent application Ser. No. 12/850,980, filed on Aug. 5, 2010, which is incorporated herein by reference.

BACKGROUND

The present invention relates generally to molded columns, and more particularly to systems and methods for installing and vertically-aligning molded columns.

Recently, molded columns have been used in place of wooden columns in residential construction. Molded columns have a number of advantages over their wooden counterparts. For example, molded columns generally cost less and are available in a wide variety of sizes and shapes. Further, molded columns are aesthetically pleasing and able to bear heavy loads.

During installation, it is important for workers to ensure that a molded column is vertically aligned. Often times, however, this can be a difficult and time consuming procedure requiring the combined manpower of multiple workers. The additional labor and time required to properly install a molded column only adds to the cost of the column. However, this cost can be reduced.

SUMMARY

The present invention provides a molded column assembly to support a load, such as a roof. The column includes a molded shaft to support the load, as well as a molded base assembly and a molded capital assembly. In many conventional column assemblies, the base and capital assemblies are not functional, but rather, are purely aesthetic. However, with the present invention, the capital and base assemblies are not only aesthetic, but functional as well. Specifically, the capital assembly and/or the base assembly comprise indexing features that allow a worker installing the column to ensure that the column is vertically aligned.

In one embodiment, the base assembly is configured to align the shaft against an underlying support surface. The capital assembly is configured to receive an upper part of the shaft and includes a capital and an indexing member. The capital has a substantially planar upper surface and an alignment opening formed in that upper surface. The indexing member is configured to be secured to an overhead support surface and seats within the alignment opening. During installation, the indexing member is aligned along a vertical axis. Therefore, once seated in the alignment opening, the capital is also vertically aligned. Further, the shaft sits within a cavity formed in the capital. Therefore, the capital vertically aligns the shaft.

The base assembly may also incorporate indexing features to assist a worker in vertically aligning the shaft. Specifically, the base assembly comprises a retaining ring having a central opening to receive the bottom part of the shaft. A plurality of notches are formed into a surface of the ring adjacent the opening. The notches form the defining ends of a "cross-hair" having its intersection at the center of the opening. The "cross-hair" functions as a visual aid to help installation workers to vertically align the column.

During the installation process, the worker may hang one end of a plumb line from the center of the indexing member. The other end of the plumb line is placed into the notches on the retaining ring to form the "cross-hair." A plumb bob is attached along the plumb line and hangs directly below the center of the indexing member. The worker can move the retaining ring until the intersection of the cross-hairs lies directly below the plumb bob. When this occurs, the indexing member, the retaining ring, and thus, the shaft, are all substantially vertically aligned along the same vertical axis.

BRIEF DESCRIPTION OF THE DRAWINGS

FIGS. 2A-2C illustrates a capital assembly configured according to one embodiment of the present invention. Particularly, FIG. 2A is a side sectional view illustrating a capital configured according to one embodiment of the present invention. FIG. 2B is a top plan view of the capital configured according to one embodiment of the present invention. FIG. 2C is a top plan view of an indexing member configured according to one embodiment of the present invention.

FIG. 3 is a side sectional view of an upper part of a column showing a capital assembly configured according to one embodiment of the present invention.

FIG. 4A is a side sectional view of a base configured according to one embodiment of the present invention. FIG. 4B is a top plan view of a retaining ring configured according to one embodiment of the present invention.

DETAILED DESCRIPTION

The present invention provides a column that facilitates the installation of the column. Particularly, the column is configured to include one or more indexing features that allow a worker to quickly and easily install the column such that the column is vertically aligned. Additionally, the indexing features allow for a single worker to install the column rather than many workers, as is conventional.

Figure 1A:
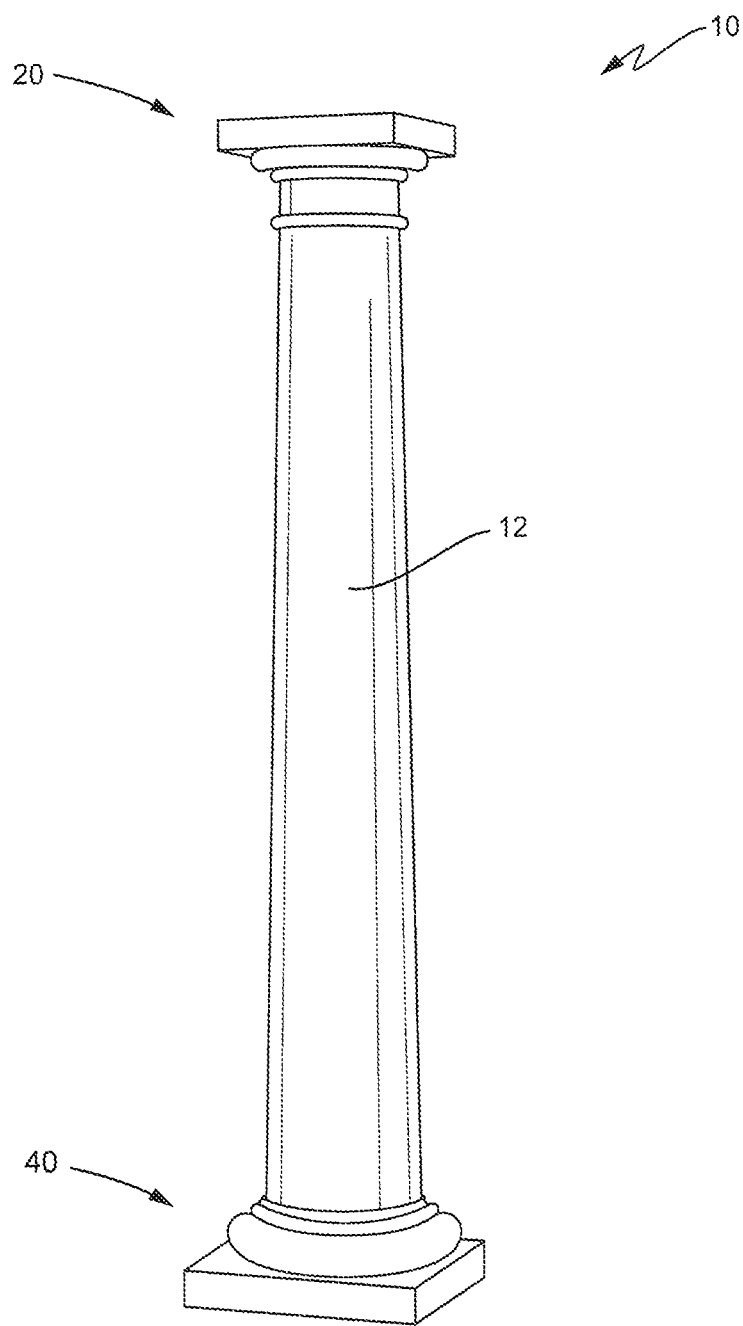
FIG. 1A is a perspective view illustrating some of the components of a column configured according to one embodiment of the present invention.
Figure 1B:
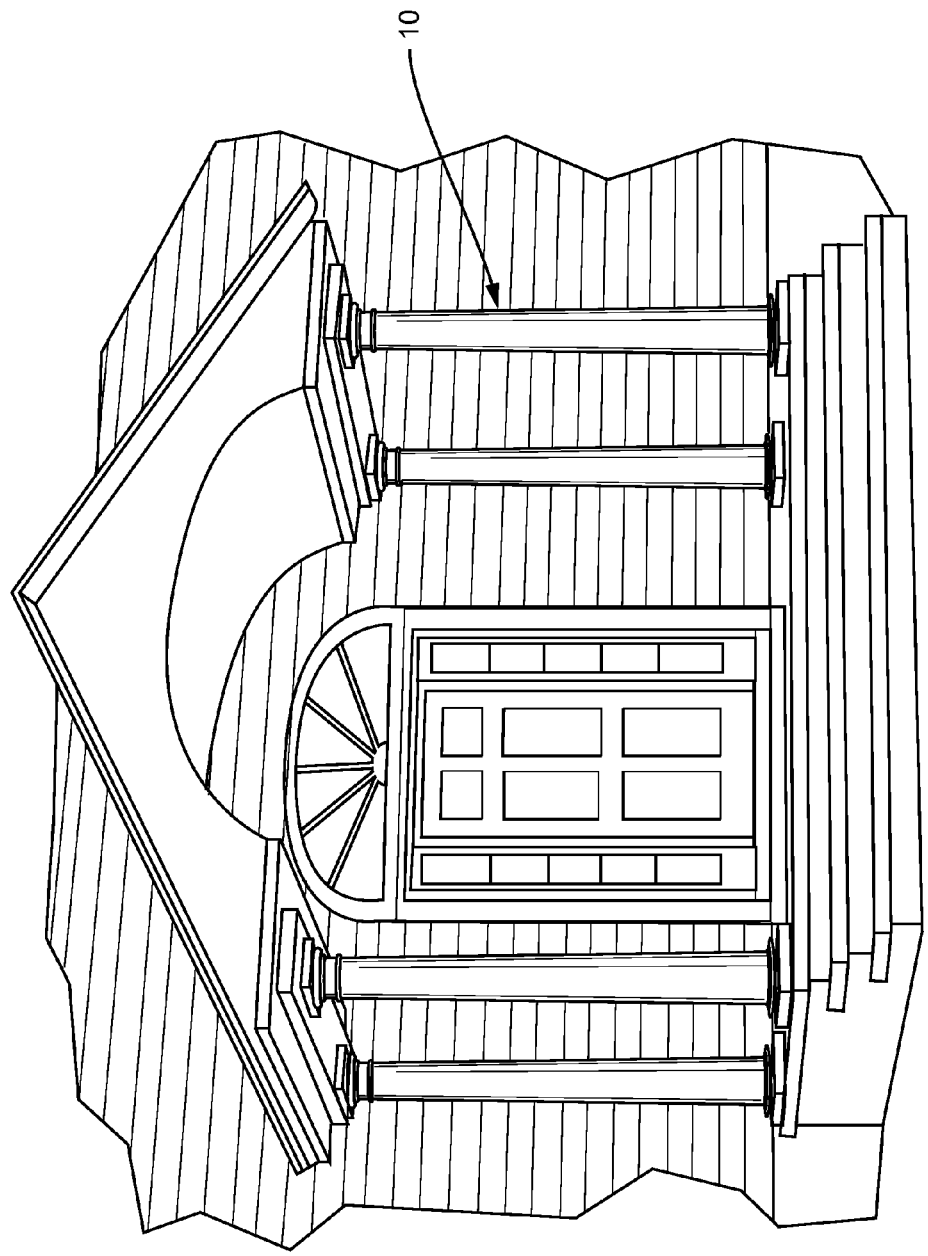
FIG. 1B is a perspective view of a residential column installed according to one embodiment of the present invention.

Turning now to the drawings, FIGS. 1A-1B illustrates a column 10 configured according to one embodiment of the present invention. As seen in FIG. 1A, a column 10 includes a molded shaft 12, a capital assembly 20, and a base assembly 40. The shaft 12 in this embodiment comprises a unitary, elongated, cylindrical molded column and is used to support a load, such as that of a porch roof or other overhead structure (see FIG. 1B). Shaft 12 may be produced using any material and/or manufacturing process known in the art; however, in at least one embodiment, shaft 12 is manufactured using a centrifugal molding technique. With this technique, a worker first creates a viscous molding material by mixing a material such as calcium carbonate with a hardening agent such as polyester resin. The worker then pours the viscous molding material into an elongated mold that is spun at high speed to force the molding material against the inner surface of the mold. After the material hardens, the worker removes the molded column from the centrifugal mold for finishing.

FIGS. 2A-2C illustrate the component parts of the capital assembly 20 in more detail. The capital assembly 20 comprises a capital 22 (FIGS. 2A and 2B) and an indexing member 32 (FIG. 2C). The capital 22 is a decorative element that is disposed at the upper part of the column 10 after installation is complete. As seen in FIGS. 2A-2B, the capital 22 comprises an upper surface 24 and a lower surface 26 and is substantially enclosed to form an interior cavity 28. An opening is formed in the lower surface 26 of the capital 22, and is sized and shaped to receive a corresponding upper part of the shaft 12. The top surface 24 of the capital 22 comprises a generally flat, planar surface that, as seen in more detail later, will contact an underlying support surface.

An alignment opening 30 is formed substantially at the center of the top surface 24. In this embodiment, the opening 30 is formed as a round hole that opens into the interior cavity 28. In use, the indexing member 32 seats within the opening 30. The size and shape of the opening 30 may be any size and shape desired; however, the opening 30 will have a size and shape that substantially matches that of the corresponding indexing member 32.

The indexing member 32 also comprises a generally flat, planar upper surface 34 that contacts the surface of the overhead support structure and a through-hole 36 that receives a mechanical fastener (e.g., a deck screw). According to one embodiment of the present invention, a worker may use the mechanical fastener to fixedly attach the indexing member 32 to the overhead support surface. Once affixed to the overhead support, the indexing member 32 aligns the capital 22 such that the capital 22, in turn, is in a proper position to vertically align the shaft 12.

FIG. 3 is a sectional view illustrating how the capital assembly 20 may be installed to align the shaft 12 along a vertical axis v via the capital 22 according to one embodiment of the present invention. Particularly, the worker first determines where the capital 22 will make contact with the surface $S_H$ of an overhead support, such as a header H. Then, the worker affixes the indexing member 32 to the surface $S_H$ using, for example, a deck screw 38 extending through the through-hole 36. The indexing member 32 is positioned such that a center point of the indexing member 32 is aligned along the vertical axis v. Once attached, the top surface 34 of the indexing member 32 contacts the surface $S_H$ of the header H.

It should be noted that the indexing member 32 in this embodiment illustrates only a single, centrally-located through-hole 36. However, this is for illustrative purposes only. Those skilled in the art will appreciate that the indexing member 32 may comprise more than one through-hole 36 such that a worker may use multiple screws 38 to secure the indexing member 32 to the surface $S_H$. Further, regardless of the number of through-holes 36, a center point of the indexing member 32 will be aligned with the vertical axis v.

Once the indexing member 32 is affixed to surface S, the worker can move the capital 22 upwardly towards the header H such that the capital 22 mates with the indexing member 32. Particularly, the indexing member 32 has a size and shape that corresponds to the size and shape of the alignment opening 30 formed in the top planar surface 24 of the capital 22. Thus, the indexing member 32 may be seated within the alignment opening 30. Once seated, the worker moves an upper part of the shaft 12 through the opening formed in the lower surface 26 of the capital 22 and into the cavity 28. As seen in FIG. 3, the terminal end of shaft 12 abuts an interior surface of the capital 22 to press the capital 22 firmly against the surface $S_H$ of header H.

Because the indexing member 32 is aligned along the vertical axis v and seats within the capital 22, the indexing member 32 vertically aligns the capital 22 along the vertical axis v. Further, the vertically-aligned capital 22 extends around the exterior surface of the shaft 12. Therefore, the center of the shaft 12 is also substantially vertically aligned along the vertical axis v. Thus, the indexing member 32 of the present invention may be utilized to align the shaft 12 of the column 10 via the capital 22.

The process of installing these columns requires fewer workers than do the installation processes of conventional columns. Particularly, ensuring vertical alignment using a column 10 of the present invention requires the workers to ensure the vertical alignment of a small, manageable indexing member 32. Once that is aligned, the structural aspects of the column and shaft ensure that they will align with the indexing member. Conventional processes, in contrast, require workers to align the shaft and/or the capital as a complete unit. These, however, are often harder to handle and to vertically align, thereby requiring more time, effort, and personnel to install.

Figure 4A:
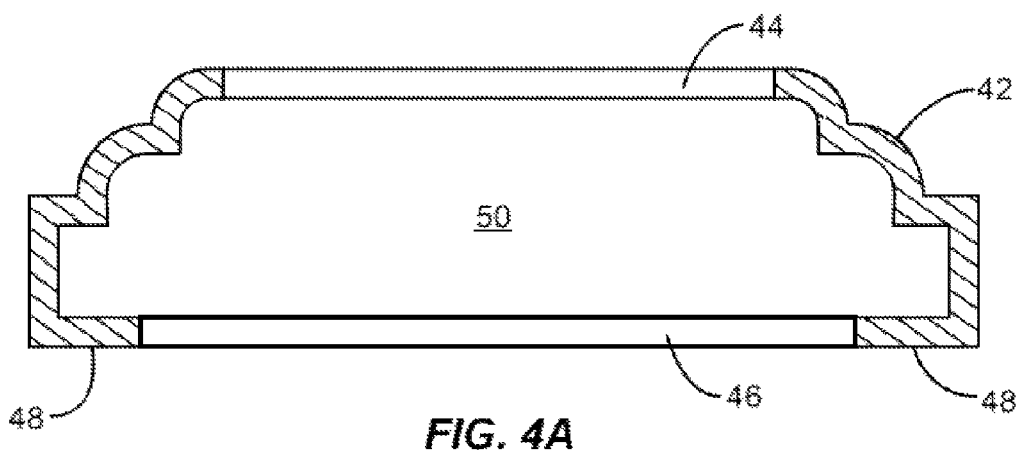
FIGS. 4A-4B illustrates a base assembly configured according to one embodiment of the present invention. Particularly.
Figure 4B:
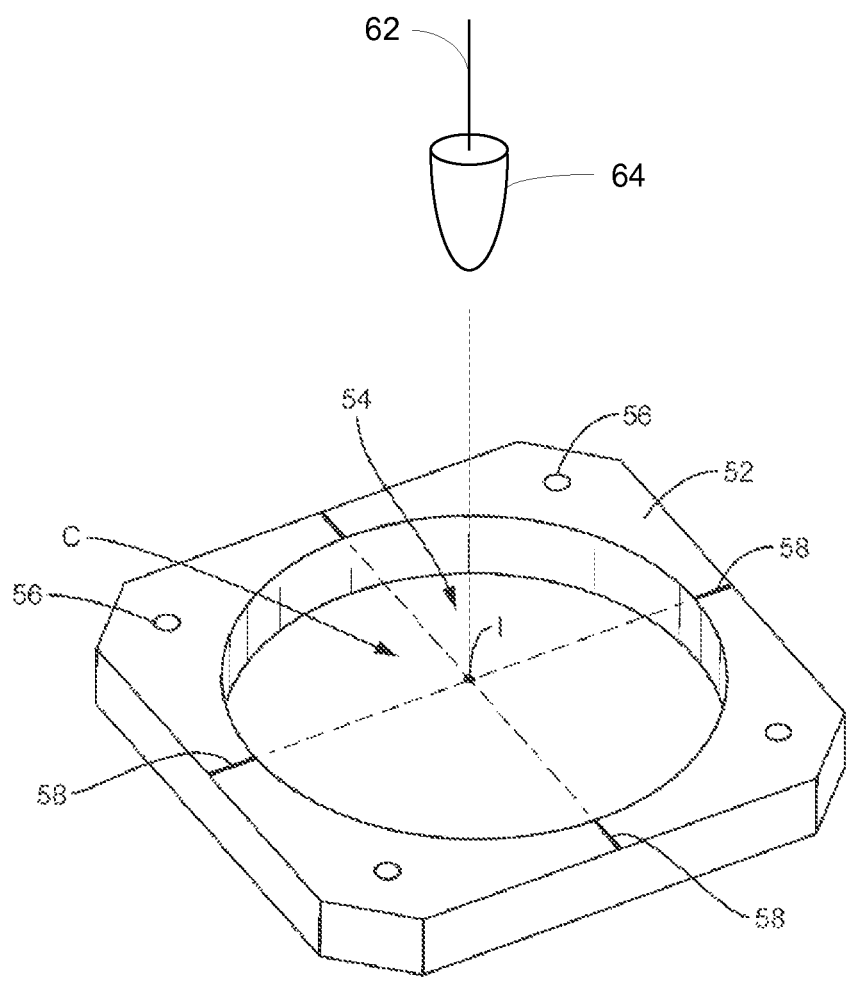

FIGS. 4A-4B illustrate the components of a base assembly 40 and another indexing feature of the present invention. As seen in these figures, the base assembly 40 comprises a base or "plinth" 42 (FIG. 4A) and a retaining ring 52 (FIG. 4B). The plinth 42 is a decorative element disposed at the bottom end of the shaft 12 after installation. The main function of the plinth 42 is to cover the retaining ring 52 and provide aesthetics. The plinth 42 is a substantially enclosed member, but has an opening 44 in a top surface to receive a lower part of the shaft 12 into an interior cavity 50. The plinth 42 also includes an opening 46 formed in a bottom surface 48. The opening 46 is sized and shaped to receive the retaining ring 52 once the retaining ring 52 is installed.

Retaining ring 52 comprises a plate-like member having a centrally located opening 54 and a plurality of holes 56. The central opening 54 receives the lower part of the shaft 12, while the holes 56 receive corresponding mechanical fasteners such as deck screws to securely affix the retaining ring 52 to an underlying support surface. Additionally, the retaining ring 52 comprises a plurality of notches 58 formed in the upper surface of the retaining ring 52. The notches 58 are disposed adjacent the central opening 54 and arranged so as to form the defining ends of a "cross-hair" C having an intersection/located at a center of the opening 54. As will be seen in more detail below, the notches 58, in concert with another vertical alignment mechanism, allow a worker to ensure that the center of the retaining ring 52 and, thus, shaft 12 is vertically aligned with the center of the indexing member 32.

Figure 5:
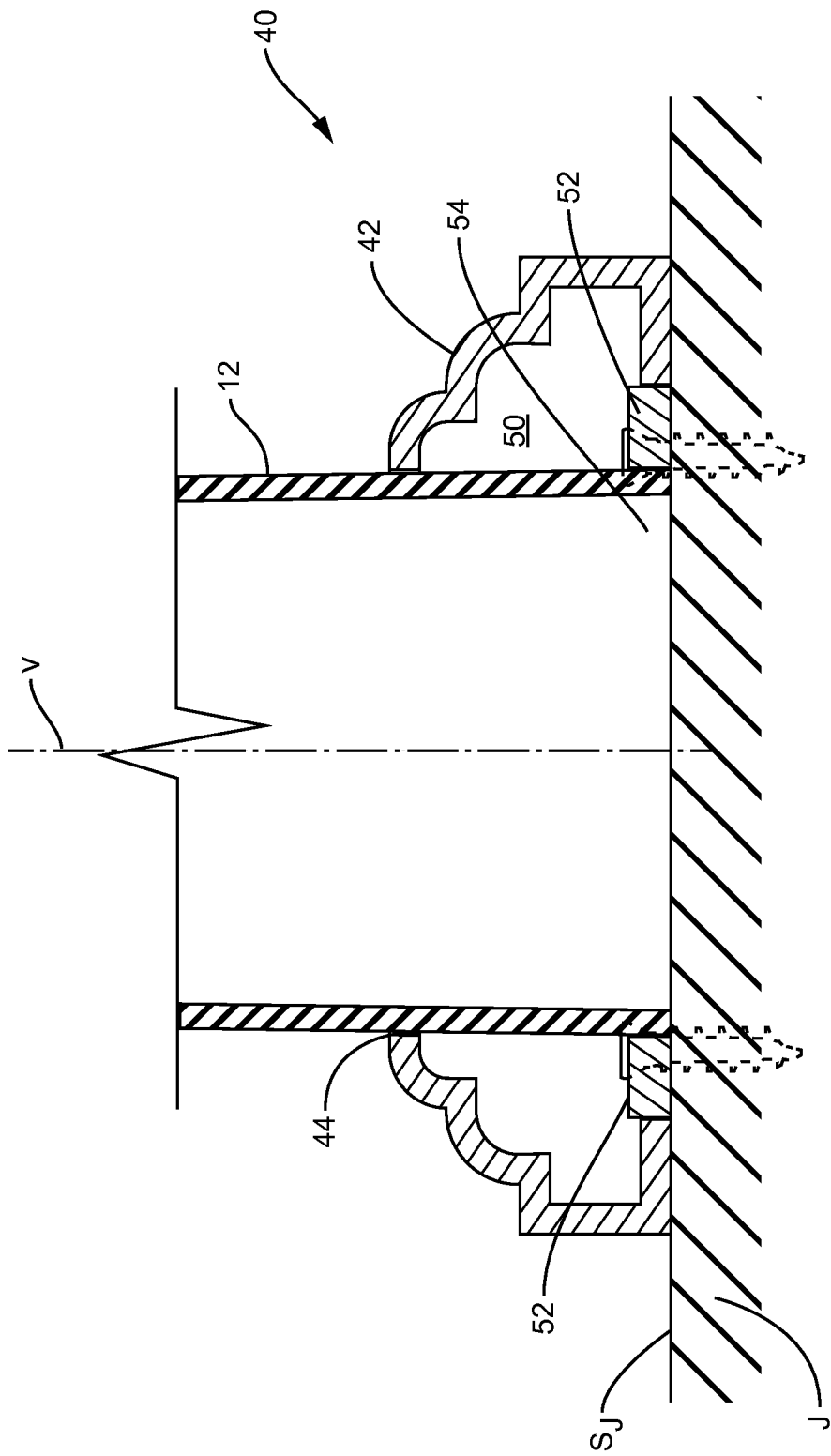
FIG. 5 is a side sectional view of a lower part of a column showing a base assembly configured according to one embodiment of the present invention.

FIG. 5 is a sectional view illustrating how the base assembly 40 may be installed according to one embodiment of the present invention. As seen in FIG. 5, the respective centers of shaft 12 and base assembly 40 are substantially aligned along the vertical axis v, and thus, are also substantially aligned with the center of the indexing member 32. The retaining ring 52 is screwed into the surface $S_J$ of an underlying support member, such as floor joist J. The lower part of the shaft 12 extends through opening 44 in the top surface of plinth 42 and the central opening 54 of the retaining ring 52, and is supported by the surface $S_J$. The retaining ring 52 prevents the undesirable lateral movement of the bottom of the shaft 12. The plinth 42 is placed over the retaining ring 52 such that it covers the retaining ring 52 and the mechanical fasteners securing the retaining ring 52 to the surface $S_f$.

Figure 6:
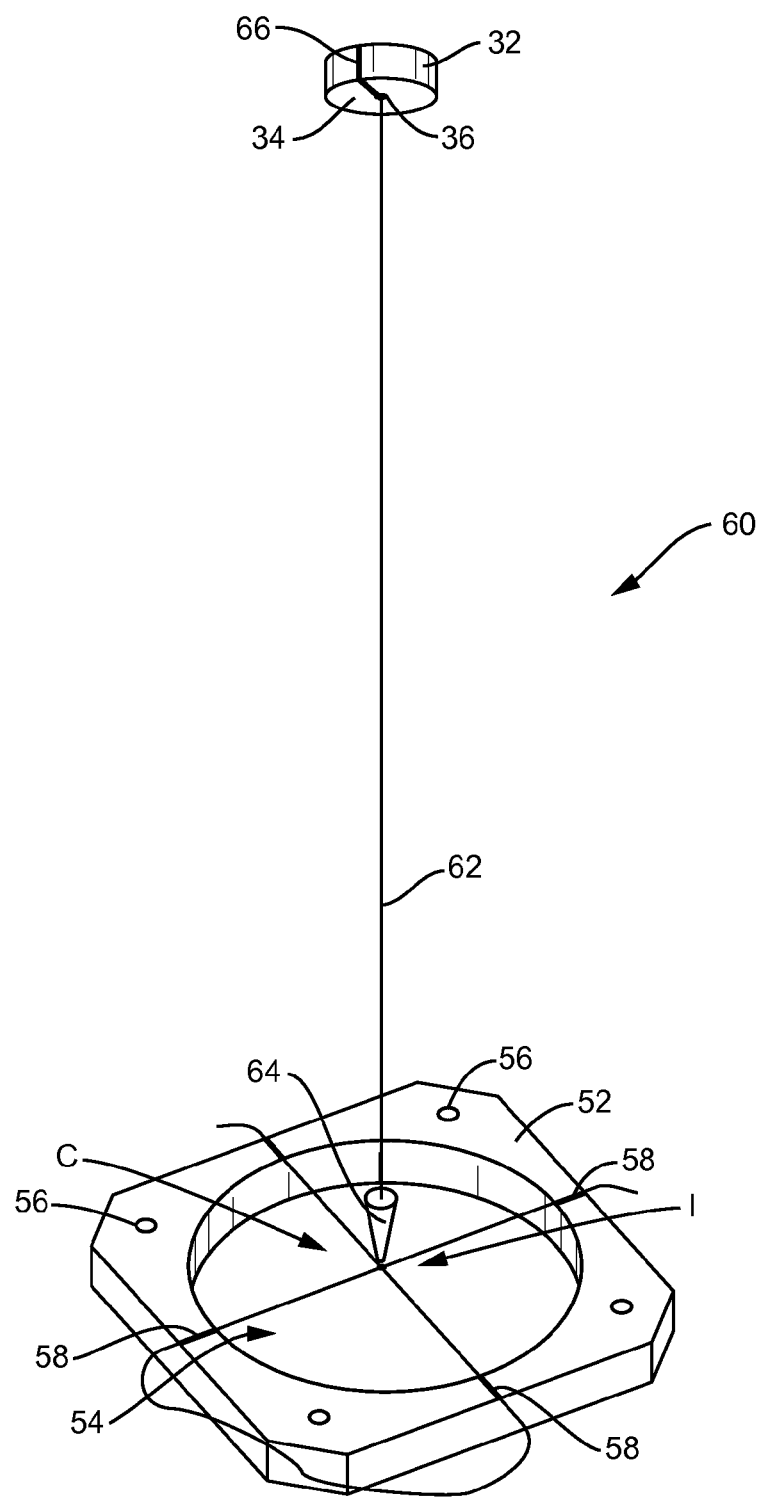
FIG. 6 is a perspective view illustrating an alignment mechanism configured to vertically align a center of the retaining ring to a center of the indexing member according to one embodiment of the present invention.

It was previously stated that the notches 58 formed in the upper surface of the retaining ring 52 function to help a worker align the retaining ring 52 along the vertical axis v. As seen in FIG. 6, this can be accomplished with the help of an alignment mechanism 60. The alignment mechanism 60 comprises a flexible plumb line, such as a string, and a mass or "bob" 64 connected to the plumb line 62. An elongated slit 66 is also formed in the indexing member 32 and extends from the periphery of the indexing member 32 to centrally located opening 36. The slit 66 allows the worker to slide one end of the plumb line 62 to the center of the indexing member 32 while installing the indexing member to the overhead support H.

The other end of the plumb line 62 is placed into the notches 58 to visually create the cross-hair C. This functions as a visual aid so that the worker can more accurately align the retaining ring 52 along the vertical axis v. Particularly, the bob 64 hangs below the center of the indexing member 32, which as stated above, is aligned along the vertical axis v. The intersection/indicates the center of the retaining ring 52. As seen in FIG. 6, using the cross-hair C as a guide, the worker can place the retaining ring 52 on the underlying support surface such that the bob 64 is suspended directly above the intersection I. Once this occurs, the center of the retaining ring 52 is directly below the center of the indexing member 32 and aligned along the vertical axis v. The worker can then use the mechanical screws to securely affix the retaining ring 52 to the underlying support surface, and place the shaft 12, capital 22, and plinth 42 into position. The shaft 12 will be aligned along the vertical axis v because the indexing member 32, the capital 22, and the retaining member 42 are aligned along the axis v.

The present invention may, of course, be carried out in other specific ways than those herein set forth without departing from the scope and essential characteristics of the invention. For example, the columns described previously are not limited for use in residential construction, but rather, may be used for commercial applications as well. Further, the columns 10 need not be cylindrical or smooth. In many cases, the columns 10 comprise square columns and/or are fluted. Therefore, the present embodiments are to be considered in all respects as illustrative and not restrictive, and all changes coming within the meaning and equivalency range of the appended claims are intended to be embraced therein.

What is claimed is:

1. A kit for forming a column assembly, the kit comprising:
    a shaft, a capital assembly, and a base assembly, wherein the shaft is configured to be combined with the capital assembly and the base assembly for forming a column;
    an indexing member configured to be affixed to an overhead support structure for aligning an upper end of the column after affixing the indexing member;
    a targeting member configured to be associated with the base assembly for indicating the center of the base assembly;
    an alignment mechanism configured to align the center of the base assembly with a center of the indexing member affixed to the overhead support structure for aligning the center of the base assembly prior to installation of the shaft such that the column is aligned vertically; and wherein said alignment mechanism comprises:
        a plumb line that attaches to the center of the indexing member; and
        a bob that attaches to the plumb line, wherein the bob is configured to hang freely from the center of the indexing member such that the bob is suspended over the targeting member.

2. The kit of claim 1, wherein the targeting member comprises at least two cross hairs and the cross hairs are a visual aid to vertically align the center of the base assembly with the center of the indexing member.

3. The kit of claim 1, wherein the base assembly comprises a retaining ring having a central opening to receive the bottom part of the shaft, and wherein cross hairs are disposed within the central opening for aligning the base assembly with the indexing member.

4. The kit of claim 1, wherein the indexing member comprises an elongated slit that extends from a periphery of the indexing member to the center of the indexing member, and is sized to receive the plumb line.

5. The kit of claim 1, wherein the capital assembly further comprises a capital with a central opening configured to receive the upper end of the shaft.

6. The kit of claim 1, wherein the indexing member is configured to extend into the shaft and locate the upper end of the shaft.

7. The kit of claim 1, wherein the targeting member indicates a center point of the base assembly, and wherein a lower end of the bob has a conical shape for locating the center point of the targeting member when the bob is suspended over the targeting member.

8. A method of installing a column assembly comprising a shaft, a capital assembly and a base assembly, the method comprising:
    obtaining a shaft, a capital assembly, a base assembly, an indexing member, a bob, and a plumb line;
    affixing the indexing member to an overhead support structure;
    vertically aligning a center of the base assembly with a center of the indexing member after the indexing member is affixed to the overhead support structure by:
        suspending, over a targeting member that indicates the center of the base assembly, the bob attached to the plumb line that is attached to a center of the indexing member, wherein the bob is configured to hang freely from the center of the indexing member; and
        aligning the targeting member with the center of the indexing member using the bob; and
    after the aligning of the center of the base assembly with the center of the indexing member, installing the shaft such that the column is aligned vertically.

9. The method of claim 8, wherein the targeting member comprises at least two cross hairs and the cross hairs are a visual aid to vertically align the center of the base assembly with the center of the indexing member.

10. The method of claim 8, wherein the base assembly comprises a retaining ring having a central opening to receive the bottom part of the shaft, and wherein notches of the base assembly are disposed within the central opening for aligning the base assembly with the indexing member.

11. The method of claim 8, wherein the indexing member comprises an elongated slit that extends from a periphery of the indexing member to the center of the indexing member, and is sized to receive the plumb line for suspending the bob from a center of the indexing member.

12. The method of claim 8, wherein the capital assembly further comprises a capital with a central opening configured to receive the upper end of the shaft.

13. The method of claim 8, wherein the indexing member is configured to extend into the shaft and locate the upper end of the shaft.

14. The method of claim 8, wherein the method comprises affixing the aligned base assembly to an underlying support structure below the overhead support structure and the installing the shaft comprises installing the shaft after affixing the aligned base assembly.

15. The method of claim 8, wherein installing the shaft comprises installing the shaft between the indexing member and the base assembly that are each immobile.

16. The method of claim 8, wherein the column is aligned vertically by the indexing member aligning an upper end of the column and the base assembly aligning a lower end of the column.

17. The method of claim 8, wherein the overhead support structure is part of a stationary structure comprising an underlying support structure, and the method comprises affixing the aligned base assembly to the underlying support structure below the overhead support structure and the installing the shaft comprises installing the shaft after affixing the aligned base assembly.

18. The method of claim 17, wherein the position of the overhead support structure in the stationary structure relative to the underlying support structure is fixed prior to affixing an indexing member to the overhead support structure.

19. The method of claim 8, wherein the targeting member indicates a center point of the base assembly, and wherein a lower end of the bob has a conical shape for locating the center point of the targeting member when the bob is suspended over the targeting member.

* * * * *